(12) United States Patent
Blocher et al.

(10) Patent No.: US 11,043,883 B2
(45) Date of Patent: Jun. 22, 2021

(54) METHOD FOR THE PRODUCTION OF A STACK OF LAMINATIONS

(71) Applicant: Kienle + Spiess GmbH, Sachsenheim (DE)

(72) Inventors: Daniel Blocher, Pürgen (DE); Steffen Bauer, Zaberfeld (DE); Andras Bardos, Heiligenhaus (DE)

(73) Assignee: Kienle + Spiess GmbH, Sachsenheim (DE)

( * ) Notice: Subject to any disclaimer, the term of this patent is extended or adjusted under 35 U.S.C. 154(b) by 415 days.

(21) Appl. No.: 15/361,437

(22) Filed: Nov. 27, 2016

(65) Prior Publication Data

US 2017/0077790 A1    Mar. 16, 2017

Related U.S. Application Data

(62) Division of application No. 14/384,713, filed as application No. PCT/EP2013/000742 on Mar. 13, 2013, now Pat. No. 9,531,223.

(30) Foreign Application Priority Data

Mar. 14, 2012 (DE) ...................... 10 2012 005 795.4

(51) Int. Cl.
*H01F 3/04* (2006.01)
*H02K 15/12* (2006.01)
(Continued)

(52) U.S. Cl.
CPC ............. *H02K 15/12* (2013.01); *B21D 28/02* (2013.01); *B32B 7/14* (2013.01); *B32B 27/308* (2013.01);
(Continued)

(58) Field of Classification Search
CPC .......... H01F 27/245; H01F 27/25; H01F 3/04; H01F 41/0213; Y10T 29/49078;
(Continued)

(56) References Cited

U.S. PATENT DOCUMENTS 3,523,097 A    8/1970  Coover et al.
8,474,129 B2 *  7/2013  Blocher ................ B21D 28/22
                                                156/278
(Continued)

FOREIGN PATENT DOCUMENTS

FR     2 888 390    1/2007
JP     S54-50919    4/1979
(Continued)

*Primary Examiner* — Thiem D Phan
(74) *Attorney, Agent, or Firm* — Gudrun E. Huckett

(57) ABSTRACT

In a method for manufacturing lamination stacks of controlled height in a tool, starting, material is provided as continuous strip delivered from a coil or as an individual sheet. Laminations are punched from the starting material in several punching steps to a required contour of the laminations. A heat-curing adhesive is applied onto the laminations prior to performing a last punching step. The laminations are combined to a lamination stack. The laminations of the lamination stack are partially or completely heated in a lamination storage. The adhesive is liquefied by heating the lamination stack to build up adhesion and then solidified. Curing the adhesive at the liquefying temperature or solidifying the adhesive in the tool by cooling and subsequently heating the adhesive to a temperature below the liquefying temperature is possible so that the adhesive does not melt but undergoes further curing resulting in higher temperature stability.

11 Claims, 6 Drawing Sheets

(51) Int. Cl.
  *H01F 3/02* (2006.01)
  *H01F 41/02* (2006.01)
  *H02K 15/02* (2006.01)
  *B21D 28/02* (2006.01)
  *B32B 7/14* (2006.01)
  *B32B 27/30* (2006.01)
  *B32B 27/38* (2006.01)
  *B32B 27/40* (2006.01)
  *B32B 37/12* (2006.01)
  *B32B 38/00* (2006.01)
  *H02K 1/18* (2006.01)
  *H02K 1/28* (2006.01)
  *C08G 59/40* (2006.01)
  *C09J 163/00* (2006.01)

(52) U.S. Cl.
  CPC .............. *B32B 27/38* (2013.01); *B32B 27/40* (2013.01); *B32B 37/1284* (2013.01); *B32B 37/1292* (2013.01); *B32B 38/0036* (2013.01); *H01F 3/02* (2013.01); *H01F 3/04* (2013.01); *H01F 41/0233* (2013.01); *H02K 1/18* (2013.01); *H02K 1/28* (2013.01); *H02K 15/02* (2013.01); *B32B 2037/1253* (2013.01); *B32B 2457/00* (2013.01); *C08G 59/4042* (2013.01); *C09J 163/00* (2013.01); *Y10T 29/49078* (2015.01); *Y10T 428/31515* (2015.04); *Y10T 428/31551* (2015.04); *Y10T 428/31938* (2015.04)

(58) Field of Classification Search
  CPC ......... Y10T 29/49009; Y10T 156/1052; Y10T 156/1343; Y10T 29/49112; Y10T 29/49114; B32B 27/38; B32B 37/1284; B32B 38/0036; B32B 37/1207; B32B 37/185; C09J 163/00; C09J 7/00
  USPC ...... 29/609, 417, 592.1, 596, 602.1, 603.14, 29/607
  See application file for complete search history.

(56) References Cited

U.S. PATENT DOCUMENTS

2005/0279450 A1* 12/2005 King .................. B27D 1/04
  156/304.1
2012/0156441 A1    6/2012 Gerster et al.

FOREIGN PATENT DOCUMENTS

| JP | H11-308823 | 11/1999 |
| JP | 2005-269732 | 9/2005 |
| WO | 2010/109272 | 9/2010 |

* cited by examiner

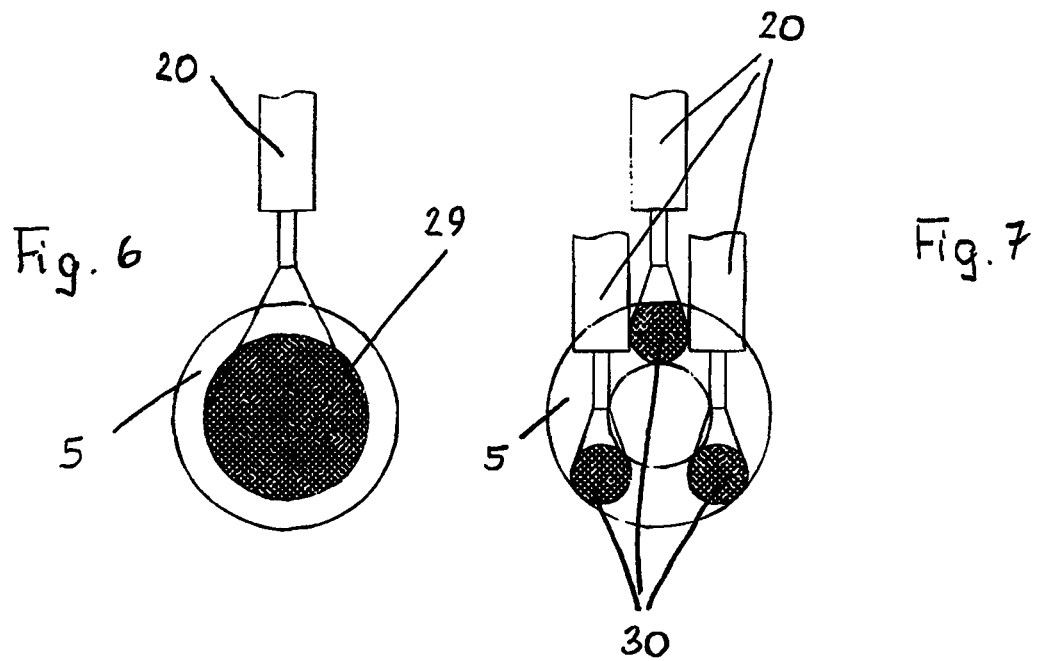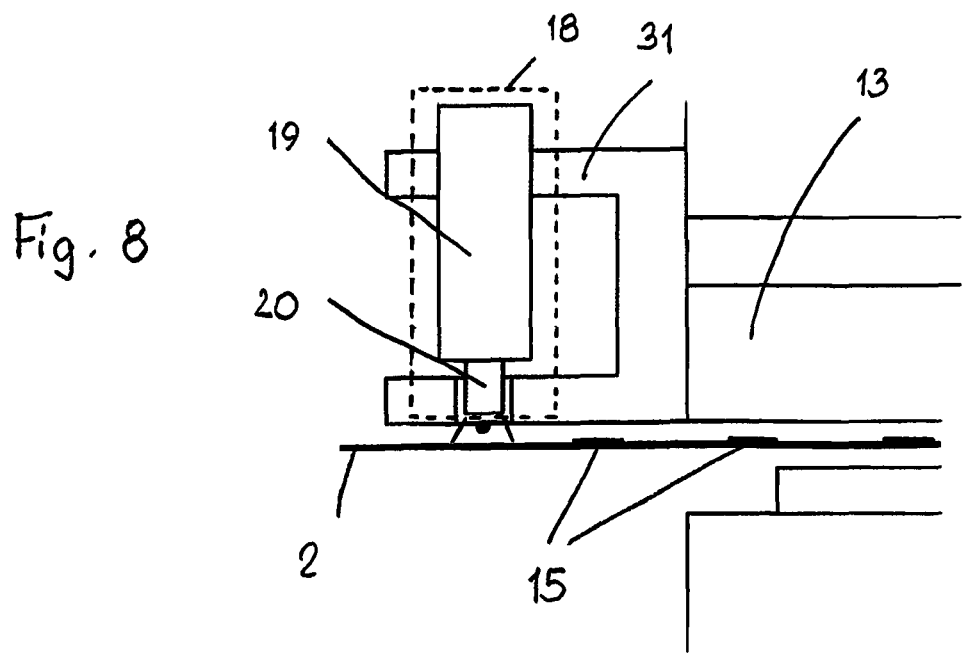

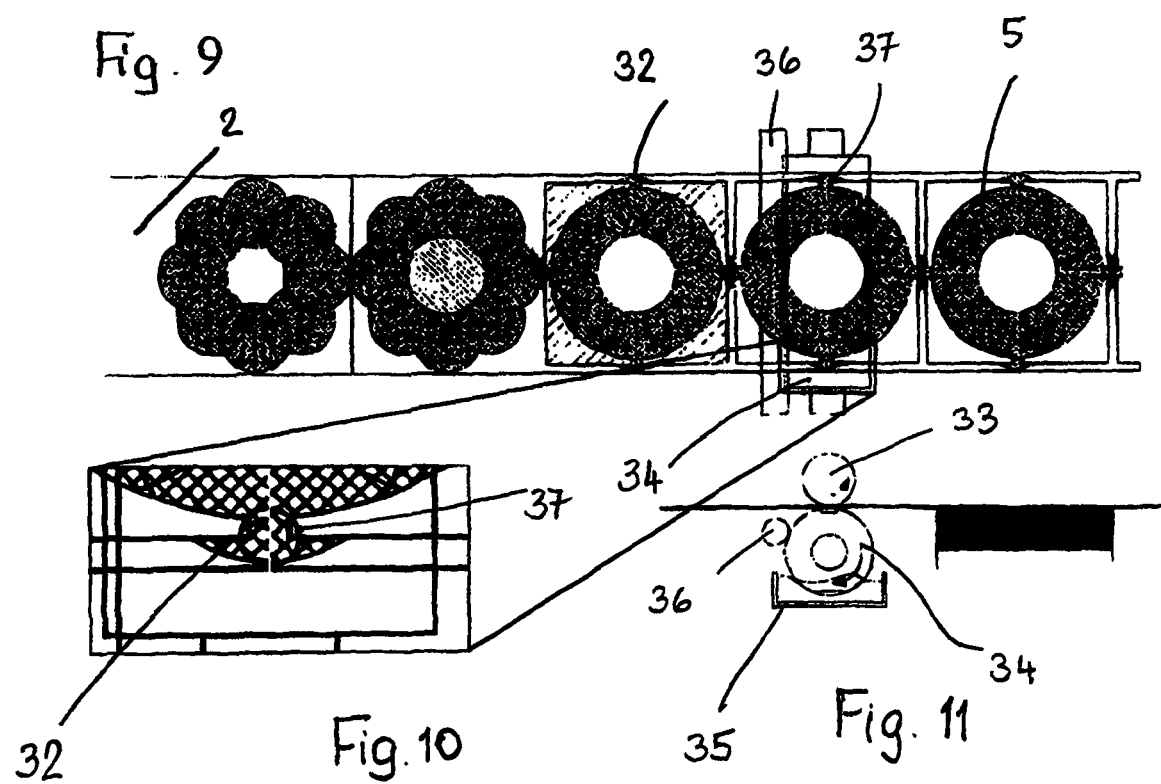

METHOD FOR THE PRODUCTION OF A STACK OF LAMINATIONS

CROSS-REFERENCE TO RELATED APPLICATIONS

This application is a divisional application of United States application for patent Ser. No. 14/384,713, having a filing date of 12 Sep. 2014, said application Ser. No. 14/384,713 being a national stage filing of international application No. PCT/EP2013/000742 having an international filing date of 13 Mar. 2013 and designating the United States, the international application claiming a priority date of 14 Mar. 2012, based on prior filed German patent application No. 10 2012 005 795.4, the entire contents of the aforesaid United States application; the aforesaid international application, and the aforesaid German patent application being incorporated herein by reference.

BACKGROUND OF THE INVENTION

The invention relates to a method for manufacturing stacks of laminations with a controlled height in a tool in which laminations are punched, have bonding agent applied to them, and are put together to form the lamination stack.

Electrical machines often use cores consisting, of stacked laminations, which are fabricated out of cut electric sheets. A punch press is normally employed to cut out the individual laminations. The core or stack can be fabricated in various ways, to include mechanically joining the parts in the press to form cores, and welding, adhesively bonding or mechanically mating the laminations into stacks outside the press.

DE 24 46 693 provides examples in the field of manufacturing stacks outside of the tool and press. This publication describes how to manufacture stacks of steel that has a thermosetting coating. EP 0 121 173 describes an approach to solving the problem, in which the laminations are provided with elevations and depressions, with which the laminations are pressed together into a stack. This so-called linkage method is associated with several disadvantages:
a) The linkage technology requires the manufacture of very complex tools, whose parts are very sensitive in terms of material quality, and can be less robust than tools with which the laminations are not linked together. This increases both the costs and the risks associated with the method, which can hamper suitability for use.
b) Very thin steel sheets, e.g., those less than 0.35 mm thick, are very difficult to link, thereby resulting in inefficient methods.
c) Some products require that each lamination be turned by a specific amount. In a stack in which the laminations are not interlinked, the rotational angle is limited by the number of existing linkage locations, i.e., the smallest possible rotational angle is 90° given four existing linkage points.
d) Another disadvantage to the current linkage technology is that materials of varying thickness or characteristics (often distinguished by different quality designations) cannot be joined together.

Other technologies that use externally applied adhesive have also been tried. Examples include DE 35 35 573 and DE 203 18 993, which both describe a method for using an adhesive that is applied to the band surface. An attempt has also been made to use capillary adhesive bonding, i.e., to run an adhesive "seam" down the outside edge of the stack.

Also known are methods (JP 2005 269 732) in which dots or lines of adhesive are applied to punched laminations. The adhesive is applied with an application head comprised of several nozzles.

In another method (JP 2001 321 850), the adhesive is sprayed onto the laminations at prescribed positions. The application unit provided for applying the adhesive has a distributor with three nozzles from which the adhesive exits.

The different existing technologies for applying adhesive to the band surface as an integrated part of core manufacture are associated with various difficulties:
a) The possible pressing rates are limited by how fast the adhesive is applied. For example, DE 203 18 993 defines speed ranges of up to 200-300 strokes per minute. Cost-effective core production requires that pressing rates measure at least 400 strokes per minute, with typical values in excess of 600 strokes per minute being highly desirable.
b) It is difficult to keep the tool clean. For example, a batch size limit of several thousand strokes is likely for one of the technologies, after which the tool has to be serviced and cleaned. The normal maintenance interval for a carbide tool lies at a minimum of 2,000,000 impacts. Shorter run times tangibly drive up the production costs.
c) Existing systems like those in DE 20 31 899 are known to have problems with component wear.

The difficulties a) through c) all illustrate the fact that applying the adhesive depends on the contact between the application unit and strip. Further difficulties are
d) The stacks fabricated with some adhesive bonding technologies can exhibit variable/unreliable stack strengths.
e) Tools with integrated application units can cost significantly more than standard tools.
f) The technology underlying the application system integrated into the tool can normally not be used in already existing tools.
g) In another known method (EP 1 833 145 A2), great success has been achieved in the contactless generation of lamination stacks with one application head per partial bond. One constraint on this method is the limited adhesive available for this method. This adhesive forms no long-term bond between the laminations under the thermal conditions for the normal range of application for such a lamination stack. Since the laminations are only partially bonded together with the adhesive, a high strength cannot be guaranteed. In addition, oscillations between the laminations cannot be prevented in some instances.

SUMMARY OF THE INVENTION

The makes it possible to fabricate stacks of laminations with the highest strength as an integrated part of the pressing operation at economically competitive speeds.

In this invention, the incoming material is routed to a compensating sheave, then to a feeder, then to the press, and then to the tool. Although the starting material for the process is usually supplied in the form of coils, cut strips of a specific length can also be used. Each material thickness that can be punched by a press can be joined together when using this technology. In particular thin materials less than 0.5 mm thick benefit from the use of adhesive bonding as the joining technology, because the precision of the tools and machines normally required for these thin materials is diminished. The method can be used to machine materials with varying quality, thickness, characteristics and coatings. It is even possible to join materials with varying quality, thickness, characteristics and coatings in the same stack.

In this product, use is preferably made of adhesives that, once completely cured, allow a sufficient strength over the long term at temperatures exceeding 80° C., in part even exceeding 180°.

Use is preferably made of radically curing adhesive systems so as to achieve a rapid curing reaction during manufacture. Methacrylate adhesives are here preferably used, which cure by way of a 2-substance system, wherein one component consists of resin, essentially comprised of ethyl methacrylates and/or methyl methacrylates and/or isobornyl methacrylates, and itself cures somewhat more slowly or not at all, and a curing component, the initiator, essentially comprised of peroxides with a cross-linker, for example consisting of trifunctional ester, and an accelerator, for example consisting of tertiary aniline derivatives. This initiator is only limitedly integrated into the adhesive matrix, and can thus only be present in limited quantities. Contact without any real mixing of both components is most often already enough to achieve a sufficient curing reaction, since individual radicals from the initiator react with the adhesive when the initiator comes into contact with the adhesive, and these reactions under certain conditions trigger an entire chain of additional reactions within the adhesive. The cross-linkers primarily contribute to the higher temperature stability, which preferably measures over 180° C. on a sustained basis. The cross-linkers themselves can be contained in both the initiator and adhesive.

However, the adhesive can also be an anaerobic system of resin and curing agent, in which the resin dimethacrylic acid ester and the curing agent or initiator contains dissolved metal ions, wherein the resin also cross-links in a radical reaction in combination with the metal ions, to the exclusion of oxygen.

However, the adhesive can also be a combination of the two resin and curing agent systems mentioned above (9+10), wherein this makes it possible to accelerate the curing reaction and further improve thermal resistance.

In this process, the initiator is applied partially in flat areas or over the full surface of the upper and/or lower side of the strip without contact via spraying or vapor deposition or with contact via punching, milling, rolling or another flat application process. The quantity and hence layer thickness of the initiator is controlled by the application device, so that the curing reaction can be accelerated and/or the characteristics of the subsequent adhesive bond can be optimally adjusted.

The adhesive itself is applied without contact as drops in the form of individual drops, or applied partially in flat areas or over the full surface of the upper and/or lower side of the strip without contact via spraying or with contact via punching, milling or rolling. However, the adhesive is preferably applied to the other side of the band material wetted by the initiator, although it can also be applied to the same side.

If the adhesive is applied over the full surface, it is preferably applied right before the lamination is detached from the material strip so as to minimize contamination of the tool with adhesive, and also, in particular through spatial separation, to avoid contact with the initiator, and thus a curing reaction.

However, it is also possible to first apply the adhesive, and subsequently apply the initiator to the opposite side, but then to spray it onto the adhesive preferably without contact and/or directly, immediately and a few seconds before joining with the adjacent lamination takes place, and hence before initial reactions in the adhesive system have progressed too far.

The adhesive can be applied before or after the tool with external equipment or inside the tool itself by means of an integrated system. There are various options in terms of where precisely to apply the adhesive. For example, it is also possible to apply the initiator in the tool, and store the laminations outside of the punch system or directly continue processing them by also wetting, them outside of the punch system and adhesively bonding them in a separate clamping device.

During the process in the tool, the strip is punched into individual laminations. The stack of laminations is joined together in the matrix. A good bond between the laminations is ensured by the pressure of the punch in the last punching operation and a brake. This high pressure is essential for uniformly curing the adhesive, which in turn imparts a uniform strength to the stack of laminations.

However, it is also possible to apply an adhesive that cures on its own when exposed to temperature, i.e., does not absolutely need an initiator. Suitable here are acrylate adhesives, for example consisting of methacrylic acid and acrylic acid, or for example epoxy resin adhesives, e.g., essentially consisting of bisphenol A, or also urethane resin adhesives. It is also applied partially or completely over the surface of one or both sides of the lamination. However, it can also be present in dry form on the band material already before the punching process.

The adhesive can be made up of a resin and curing agent system, which completely cross links only when influenced by temperature. The resin consists of epoxies, for example based on bisphenol A, novolac, etc., and the curing agent consists, for example, of polyaminoamides, polyamides, dicyandiamide, phenol resins, carbonic acid anhydrides, etc., or of a hot-melt adhesive that melts far above the usual service temperature, and thus can adhesively bond during the cooling process, for example hot-melt adhesive based on polyamide. Use can also be made of an adhesive that combines both adhesive bonding processes, for example hot-melt adhesives based on polyester urethane prepolymers with integrated isocyanate groups.

However, how the adhesive is heated is the crucial factor. Only after the punching process are the laminations preferably heated partially or, if permitted by the lamination design, completely in a lamination storage vessel, and thereby adhesively bonded. Given a partial adhesive bonding, the stack of laminations can be heated and adhesively bonded again later in a separate follow-up process. However, if this can take place completely in the tool, the product is already finished. Complete adhesive bonding becomes possible as a function of the heating technology if the product design does not exceed a distance from the outer contour of at most about 30 mm, since regions of the outer contour would otherwise burn up, and areas of the inner contour would be too cold for adhesive bonding due to the comparatively slow heat input or flow inside the stack of laminations. An induction coil can preferably be used in the tool for heating purposes, which heats the entire stack of laminations.

While clamping the laminations, it also helps to have a contact pressure that supports the reaction and bonding of the adhesive in addition to the heating process. However, it is also possible to heat the stack of laminations with any other heating systems, for example infrared radiation or heating filaments, which exhibit high resistances as current passes through, become hot as a result, and can release heat to the stack of laminations.

If the adhesive bonding of the lamination stack does not take place continuously in this hopper, a separating layer very poorly wetted with adhesive can be sprayed onto the top side of the uppermost lamination or on the bottom side of the lowermost lamination, so as to prevent any adhesive bonding from taking place there or subsequently enable an easy separation there. Or a separating film (release film) or spacer can also be inserted, which also prevents adhesive bonding at this location.

However, heating can also take place on the individual finished or partially finished lamination or directly on the material strip because very high energy is able to bring the adhesive to reaction temperature in the shortest time. This preferably takes place with induction coils placed in close proximity to the adhesive surface. FIG. 1 shows a tunnel 1 through which the strip 2 runs and to which the coils 3 are secured. However, the adhesive 4 can also be rapidly heated in such a tunnel 1 via radiation, such as laser, infrared or some other radiation source, or waves, such as microwaves. If the adhesive is heated over the partial or full surface of the lamination 5 so as to be reactive, this area is joined with the adjacent lamination when separating the lamination out of the strip, and fixed in place under a pressure until such time as the curing reaction has sufficiently run its course.

In this system, the individual stacks of laminations can also be separated by briefly deactivating the heat source and not heating a lamination enough for the curing reaction. However, the separating processes mentioned in 22 are also conceivable.

However, it is also conceivable to combine both heating mechanisms, for example by initially heating the adhesive on the individual lamination and having the reaction remain active for even longer by keeping the stack of laminations warm and under pressure even longer in the joined state.

One option is to control the distribution of adhesive or initiator in such a way as to interrupt it when a new stack is to be initiated. This controller can be linked with a press controller, e.g., so as to prevent the distribution of adhesive drops after a fixed number of punching strokes. This would result in the fabrication of laminations without adhesive, and thus facilitate the initiation of a new stack in the brake.

A clear advantage to this technology is that it does not depend on physical bonding to join the parts together. For this reason, consecutive laminations can be turned at any angle required for the product.

The only speed constraints placed on a press when using, this technology are the speed of the adhesive application system and the curing time for the adhesive in the brake. A longer brake permits a longer curing time, if needed. As a result, this technology makes it possible to operate presses with comparable or higher speeds than with other joining technologies.

BRIEF DESCRIPTION OF THE DRAWINGS

The drawings below are intended to provide a better understanding of the description of an exemplary embodiment according to the invention.

FIG. 6 is a schematic view of an application head, with which a large area of an initiator is applied to a lamination.

FIG. 7 shows several application heads, with which several small areas of initiators are applied to a lamination.

FIG. 8 is a schematic view depicting the attachment of the adhesive application unit to a tool.

FIG. 9 is a top view of a strip on which several dots of an initiator are applied in the region above an applicator roll for an adhesive.

FIG. 10 is a magnified view of a detail on FIG. 9.

FIG. 11 is a view of three rolls used for applying adhesive.

DESCRIPTION OF PREFERRED EMBODIMENTS

An exemplary embodiment will be used below to describe this technology in detail. The stacks of laminations are being exemplarily used for rotors and/or stators of electric motors.

Figure 1:
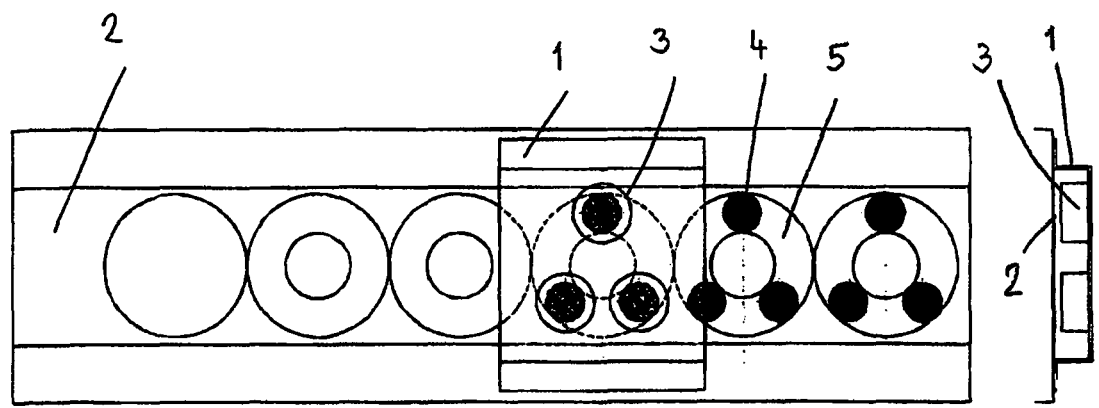
FIG. 1 is a schematic view of an induction channel with a passageway for strips from which laminations are punched.
Figure 2:
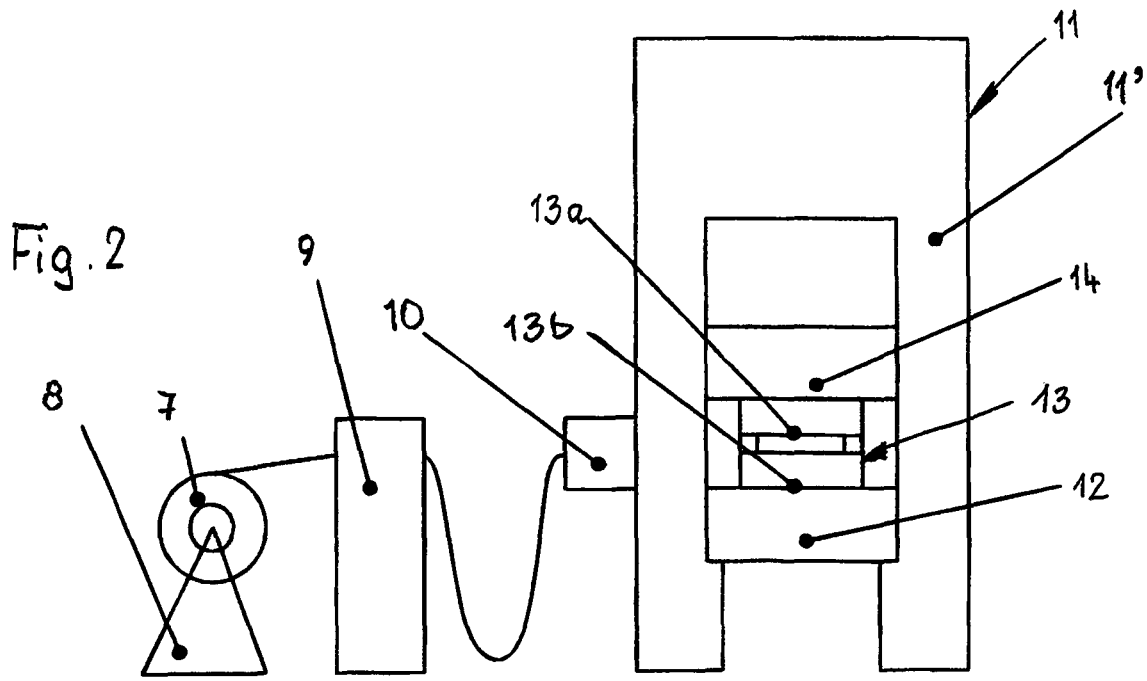
FIG. 2 is a schematic view of a punch press with a tool for manufacturing stacks of laminations.

FIG. 2 shows a schematic view of a punch press. The decoiler 8 has a coil 7 of the starting material. As evident, the material is guided through a compensating sheave 9, and then in a feed device 10 and a press frame 11' of a press 11. The tool 13 sits on a press table 12, and consists of two parts, an upper part 13a and a lower part 13b. An upper beam 14 of the press moves back and forth to punch laminations out of the strip-type material 2.

Figure 3:
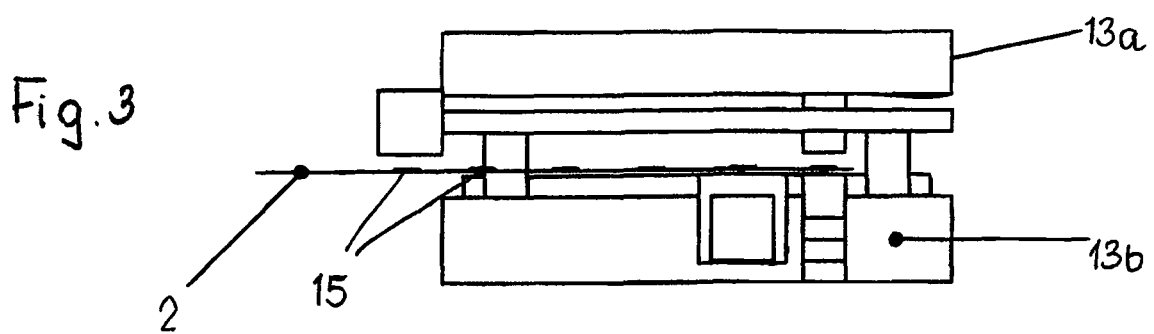
FIG. 3 is a schematic view of a tool in the punch press.

A few more details regarding the arrangement of key elements in the press frame are schematically denoted on FIG. 3. In this example, the application unit for the initiator is situated on the front side of the tool 13, and can be secured either to the upper 13a or lower 13b part of the tool 13. The application valve of the application unit operates without contact.

Prior to entry into the tool 13 or between the upper part 13a and lower part 13b, the initiator is applied over a partial or full surface of the strip-type starting material 2 in the form of a thin layer of film 15 by spraying.

Figure 4:
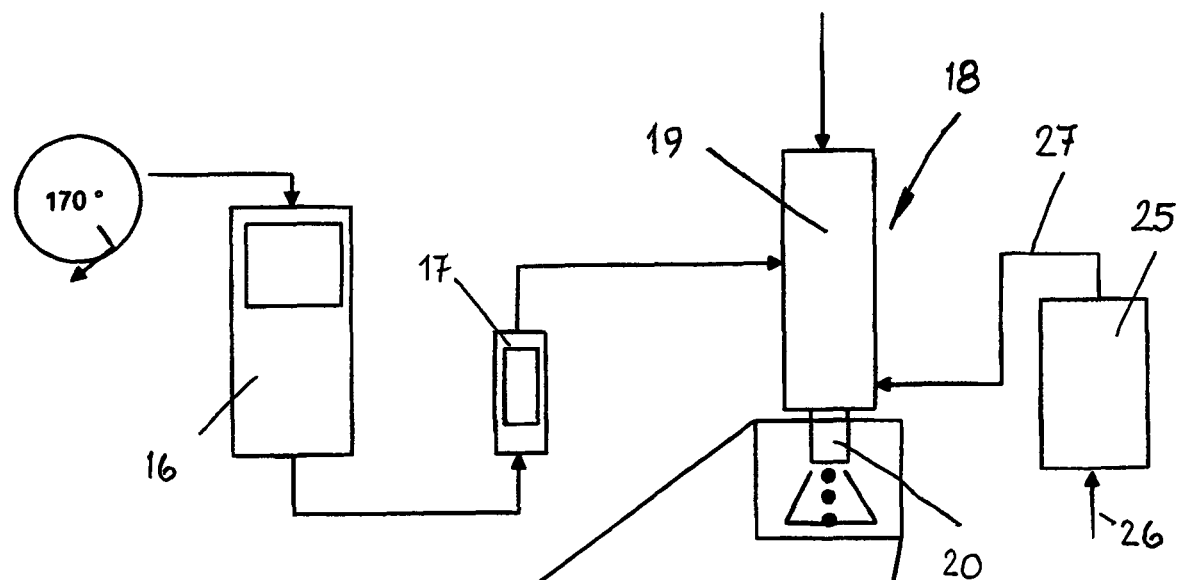
FIG. 4 is a schematic view of a controller for an adhesive application unit.
Figure 5:
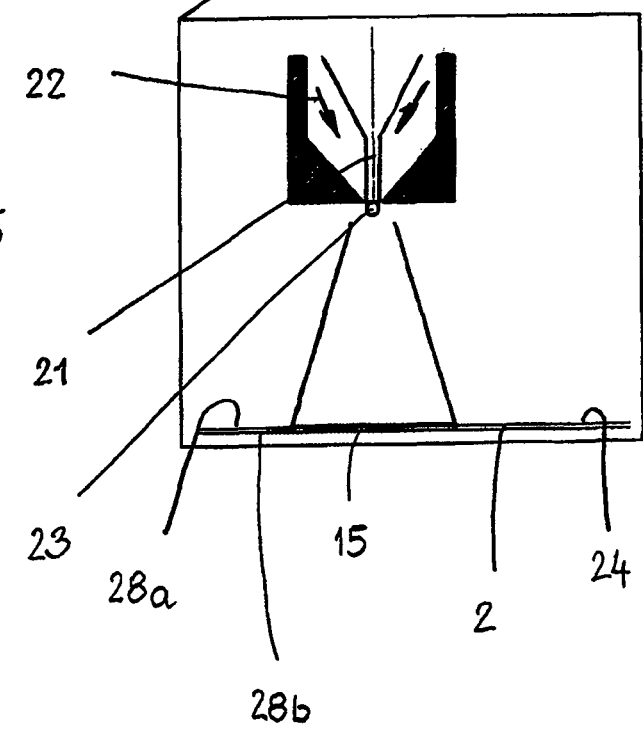
FIG. 5 is a magnified view of an application head of the adhesive and/or initiator application unit according to FIG. 4.

The press 11 is hooked up to a controller 16 (FIG. 4), which sends a control signal per press stroke to a controller 17 for actuating the application valves in an adhesive application unit 18. The signal in the controller 17 sends an electrical current pulse directly to the respective valve 19 of the application unit 18. The valve 19 for the initiator opens up a short, preset time in which the initiator is sprayed onto the strip surface as uniformly as possible under pressure. This gives rise to the thin layer of film 15 on the strip 2. The initiator exits a nozzle 21 in the form of drops (FIG. 5). The initiator drops 23 are atomized as they exit the nozzle 21 with the help of sprayed air 22. The nozzle 21 is part of an application head 20, which in turn is a constituent of the application unit 18. In the example, the application head 20 can be spaced apart from the strip surface 24 by about 1 to about 100 mm. The timing of the signal for spraying is very important. Timing is necessary so as to apply the initiator during the correct segment of the press stroke, at precisely the point where the strip material 2 is at rest. This enables a uniform distribution and exact placement of the initiator. If the initiator were to be applied during the forward motion of the band material 2, the quantity applied would have to depend on the feed rate, since the feed rate is not linear.

The initiator is stored in containers 25 next to the press 11. When the containers 25 are exposed to pressure 26, the initiator is conveyed out of the containers 25 through at least one line 27 to the application heads 20, with which the initiator is sprayed onto the strips 2 in the manner described. The freshly applied initiator surface(s) 15 (FIG. 4) then lie(s) either on the top side 28*a* or the bottom side 28*b* of the strip 2, depending on what side the initiator is sprayed. It is preferably sprayed onto the upper side 28*a* of the strip 2.

The controller 17 and application unit 18 advantageously constitute an application system. Depending on the distribution required, there is more than one application system to apply the initiator onto the strip 2. All suitable valve systems are possible as the application units 18. Whatever valve system is used must ensure that the initiator is applied to the desired locations of the strip 2.

The application unit 18 does not have to receive its signals from the press controller 16; it can also have its signals supplied by another controller.

In the case of several application units, it is also possible to adjust and/or control the latter from a joint controller 17.

The number of application heads 20 required for a lamination 5 depends on various factors, including the size of the lamination 5, so that the stability of the lamination stack 6 is uniformly distributed in the entire composite, and its shape, so that the fixing points can be arranged as symmetrically as possible, so as to thereby achieve a sufficient adhesive force (FIG. 6). One application head 20 then suffices. When larger surfaces 29 are to be wetted, for example, distinctly higher forces can be transmitted over this one surface than over smaller surfaces. Smaller surfaces 30 require more joining locations, and hence more application heads 20, to achieve the same adhesive force (FIG. 7). The application unit 18 essentially consists of the application head 20 and valve 19 (FIG. 8), and is hooked up to the tool 13 via a support device 31. It remains on the single tool 13, and is designed to fix the application unit 18 in the right position for this tool. However, the application unit 18 itself can be detached from the support device 31, and thus used with any other tool 13. The application unit 18 can also be spaced apart from the tool 13 or situated in the tool 13.

As the band material 2 wetted with the initiator passes through, it may come into contact with the tool parts, such as the punch or guiding strips, since the present initiator, which in the exemplary embodiment consists of the derivatives imine and methacrylate ester, and is applied in minimal quantities, has no self-cross-linking effect and consists primarily of volatile substances. This is why contact with the initiator does not cause the band material 2 to get stuck.

If the initiator is applied in liquid form over the entire surface of the band material before the tool, the initiator acts as a lubricating film on the punch and matrix, and therefore enables a distinctly longer service life for the punching tool, thereby increasing the total output and durability of this tool many times over.

Figure 12:
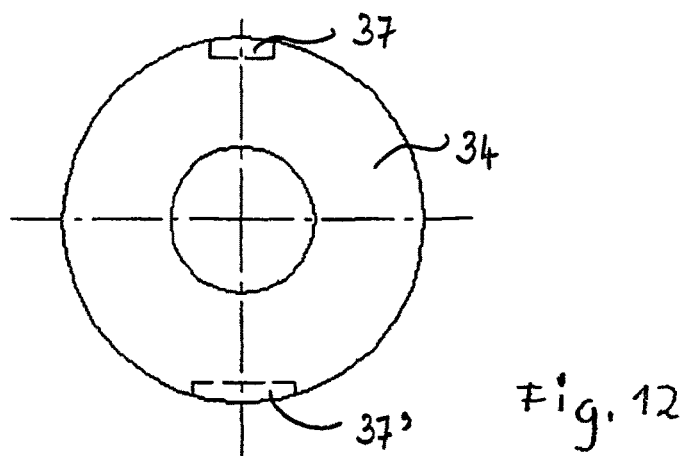
FIG. 12 is a side view of the applicator roll for the adhesive.
Figure 13:
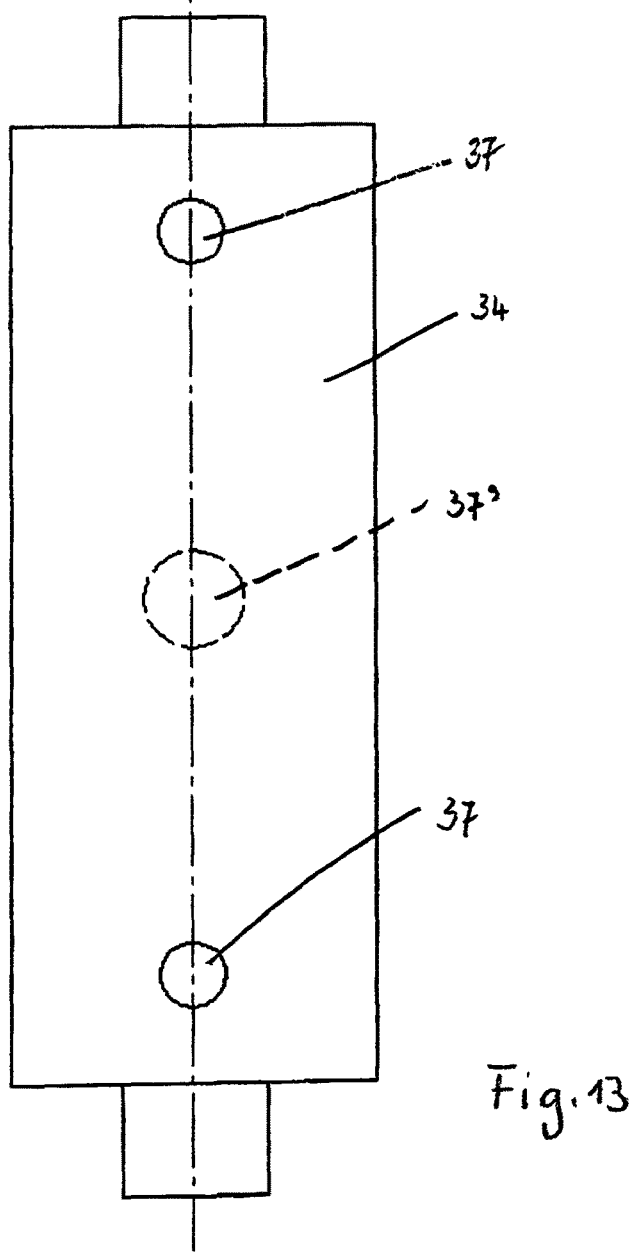
FIG. 13 is a top view of the applicator roll according to FIG. 12.

The lamination 5 is punched in a known manner in several steps with all required contours. In the last step, the lamination 5 is separated from the rest of the strip 2. The adhesive is applied directly before this last section, in which the lamination 5 is only fixed to the strip 2 by a few narrow connecting webs 32 (FIG. 9). The adhesive can be applied through roller coating, wherein the strip 2 is passed through an upper 33 and a lower 34 roller. The lower roller 34 is rubberized and wetted with adhesive. This wetting takes place according to FIG. 11 in an adhesive bath 35, in which the roller 34 dips. A third roller 36 with a minimal distance to the lower roller 34 is adjusted in such a way that the picked up adhesive 35 on the lower roller 34 is partially discharged again, thereby enabling the required layer thickness and a homogeneous distribution of the adhesive during roller coating. The rubberized roller 34 has a circumferential length corresponding to the feeding length of the tool 13. The rubberized roller 34 has recessed areas 37, 37' (FIGS. 12 and 13) that would come into contact with the areas of the connecting webs 32 while rolling off. The recesses 37, 37' cause these areas not to be wetted. As evident from FIG. 9, the length of the rollers 33, 34, 36 is greater than the width of the strips 2, so that the adhesive can be applied to any location needed on the lower side of the laminations 5. The recesses 37 are exemplarily provided near the two ends of the roller 34 at the same axial height (FIG. 13). Recess 37' lies at half the length of the roller 34, and is situated diametrically opposite the recesses 37 as viewed in the axial direction of the roller 34 (FIG. 12). The recesses 37, 37' designed as depressions have a circular contour in the exemplary embodiment shown, but can also have another suitable contour depending on the type and/or shape of the areas of the lamination 5 not to be wetted with adhesive.

During the last punching step (FIG. 14), which involves separating the lamination 5 from the band material 2 at the connecting webs 32, the detached lamination is downwardly pressed by a full-surface punch 38 into a matrix 39, causing the adhesive 35 on the lower side of the lamination 5 to come into contact with the initiator 15 on the upper side of the previously separated lamination 5. The contact between the initiator 15 and adhesive 35 triggers the cross-linking reaction, so that the laminations 5 lying on top of each other are rigidly joined together. The laminations 5 lying on top of each other are fixed in place first by the matrix 39 and later by a brake 40 until such time as the adhesive has reached a sufficient initial strength.

The brake 40 is located in a hopper-like chamber 41, in which the laminations 5 are put together to form stacks. The brake 40 ensures that the punched laminations do not descend through the hopper 41. The configuration of the brake is known, and will thus only be briefly explained. For example, the brake can be comprised of partial rings, whose inner diameter is slightly smaller than the outer diameter of the punched laminations 5. As a result, the laminations 5 are held in the hopper 41 by the brake 40. After each punching process, the punch 38 presses the next lamination onto the lamination(s) present in the brake 40. The braking force applied by the brake 40 is large enough to generate a contact pressure while pressing the respective next lamination 5 onto the already formed portion of the lamination stack that ensures a reliable adhesive bonding between the laminations 5 lying one on top of the other. The force exerted by the punch 38 is uniform over the entire lamination 5. This ensures a balanced contact over all of the laminations, along with a high pressure that facilitates a uniform bond. The time available for curing depends on the number and thickness of the laminations 5, the distance between the matrix 39 and the end of the brake 40, and the number of strokes per minute.

The longer the brake 40 is in the longitudinal direction of the hopper 41, the longer the time for which the compressed laminations 5 are situated in the brake 40. This provides more time for curing the adhesive at the same number of strokes per minute.

Figure 14:
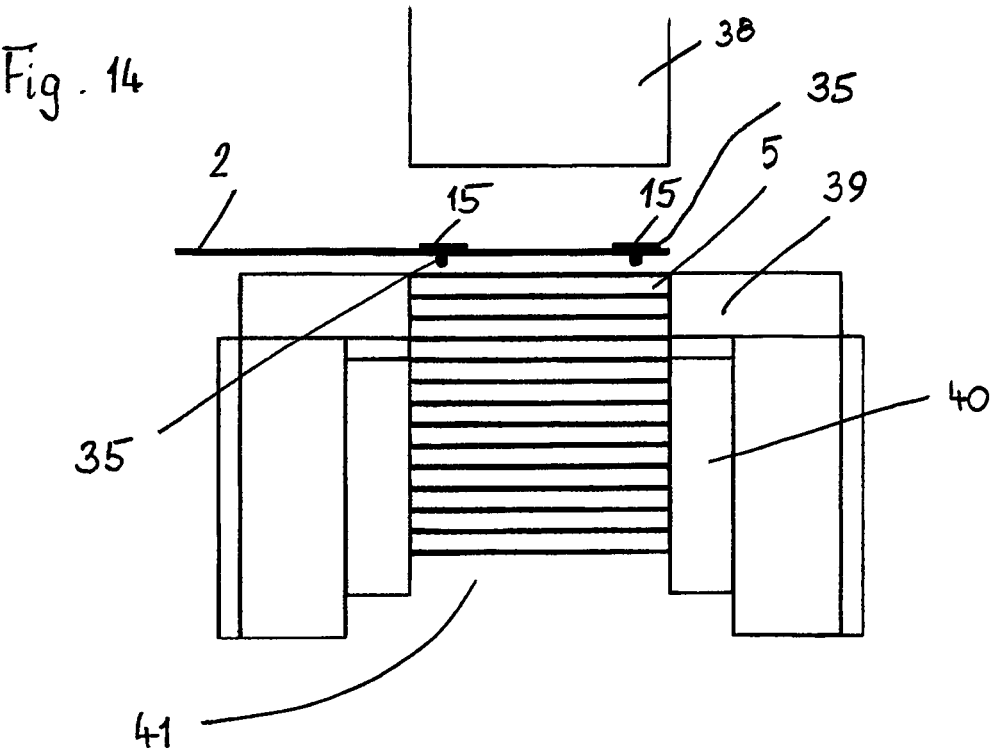
FIG. 14 is a schematic view of a hopper in which laminations lying one on top of the other are stacked into a lamination stack.
Figure 15:
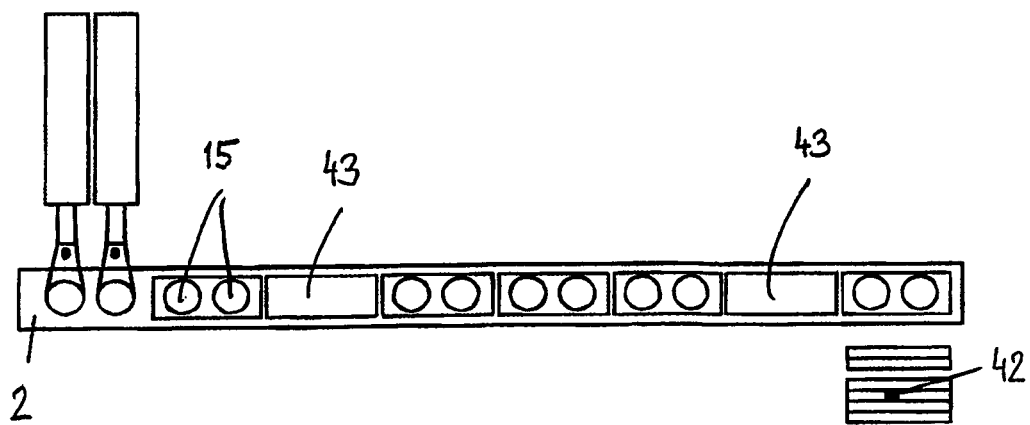
FIG. 15 is a schematic view of a strip used to punch laminations, several of which are not provided with an initiator.

When using the described example, there are several methods to ensure the desired length for the stack of laminations in this technology. FIG. 15 describes one way in which the supply of initiator 15 to the strips 2 can be interrupted in fixed intervals. The laminations 5 provided with initiator are joined together to form a stack 42 in the hopper 41 (FIG. 14). In this case, the supply of initiator 15 to the strip 2 is interrupted in fixed intervals. Laminations 43 whose upper side 28a exhibits no initiator 15 are generated in this way. The laminations joined without an initiator do not form adhesive bonds in the hopper 41 fast enough, if at all. As a consequence, the stack can be separated at this location. These laminations 43 not provided with initiator determine the height of the lamination stack 42. Since every fourth lamination exhibits no initiator in the example, stacks 42 consisting of four laminations 5 situated one on top of the other are formed in the hopper 41. At the instant the lamination 43 without initiator 15 is pressed onto the uppermost lamination 5 of the partial stack, the packet 42 has the desired height, and is later ejected from the hopper 41 in a known manner and fed to a transport device, which removes this stack. The next lamination stack 42 of four laminations 5 is now formed in the hopper 41. As soon as the lamination 43 not provided with initiator is pressed onto this partial stack, the stack 42 again has the desired height, and is later ejected. The stack height can be very easily determined in this way.

The laminations 43 not provided with initiator do not have to be punched out of the strip 2 at regular time intervals. The application of initiator can be controlled in such a way as to interrupt the supply of initiator at various time intervals. Accordingly, the number of laminations 43 in the stack 42 provided with initiator is greater in one case, and smaller in another. This makes it easy to adjust the height of the lamination stack 42.

What is claimed is:

1. A method for manufacturing lamination stacks (42) with a controlled height in a tool (13), the method comprising:
   providing a starting material as a continuous strip delivered from a coil (7) or as an individual sheet;
   punching laminations (5) from the starting material in several punching steps to a required contour of the laminations (5);
   applying a heat-curing adhesive onto the laminations (5) prior to performing a last one of the punching steps;
   combining the laminations (5) in a lamination storage to form a lamination stack;
   heating the laminations of the lamination stack partially or completely in the lamination storage to cure the heat-curing adhesive.

2. The method according to claim 1, further comprising heating the heat-curing adhesive (35) in the lamination storage (41) over a partial or full surface area of the laminations.

3. The method according to claim 1, further comprising heating the heat-curing adhesive over a partial or full surface area of the laminations very rapidly prior to joining the laminations (5) and subsequently joining the laminations (5) while the heat-curing adhesive (35) is still at a reaction temperature of the heat-curing adhesive.

4. The method according to claim 1, further comprising preheating individual ones of the laminations and reheating said individual laminations over a partial or full surface area of said individual laminations in the lamination storage to heat the heat-curing adhesive and improve an adhesive bond of the lamination stack.

5. The method according to claim 1, further comprising applying contact pressure on the laminations (5) in the lamination storage (41) to improve adhesion in a reactive and liquid phase of the heat-curing adhesive.

6. The method according to claim 1, wherein the step of heating is performed by employing an induction coil; radiation; waves; or a combination thereof.

7. The method according to claim 1, further comprising applying a separating layer that is configured to be very poorly wetted by the heat-curing adhesive onto one or more of the laminations to prevent the heat-curing adhesive to form an adhesive bond at said one or more laminations and effect a separation within the lamination stack.

8. The method according to claim 1, further comprising the step of inserting a release film between neighboring laminations in the lamination stack to prevent the heat-curing adhesive to form an adhesive bond between said neighboring laminations so that a separation within the lamination stack is produced between said neighboring laminations.

9. The method according to claim 1, further comprising the step of inserting a spacer between neighboring laminations in the lamination stack to prevent the heat-curing adhesive to form an adhesive bond between said neighboring laminations so that a separation within the lamination stack is produced between said neighboring laminations.

10. The method according to claim 1, further comprising applying contact pressure on the laminations (5) in the lamination storage (41) to improve adhesion in a reactive phase of the adhesive or in a liquid phase of the adhesive.

11. A method for manufacturing lamination stacks (42) with a controlled height in a tool (13), the method comprising:
   providing a starting material as a continuous strip delivered from a coil (7) or as an individual sheet;
   punching laminations (5) from the starting material in several punching steps to a required contour of the laminations (5);
   applying a heat-curing adhesive onto the laminations (5) prior to performing a last one of the punching steps;
   combining the laminations (5) to form a lamination stack;
   heating with a heat source the laminations of the lamination stack partially or completely in a lamination storage to cure the heat-curing adhesive;
   briefly deactivating the heat source at one or more of the laminations of the lamination stack so that said one or more laminations do not reach a temperature at which the heat-curing adhesive cures to produce an adhesive bond, causing said one or more laminations to not adhesively bond within the lamination stack so that a separation within the lamination stack is produced.

* * * * *